T. M. NICHOLS.
CRANE.
APPLICATION FILED NOV. 22, 1919.
1,434,623.
Patented Nov. 7, 1922.
5 SHEETS—SHEET 2.
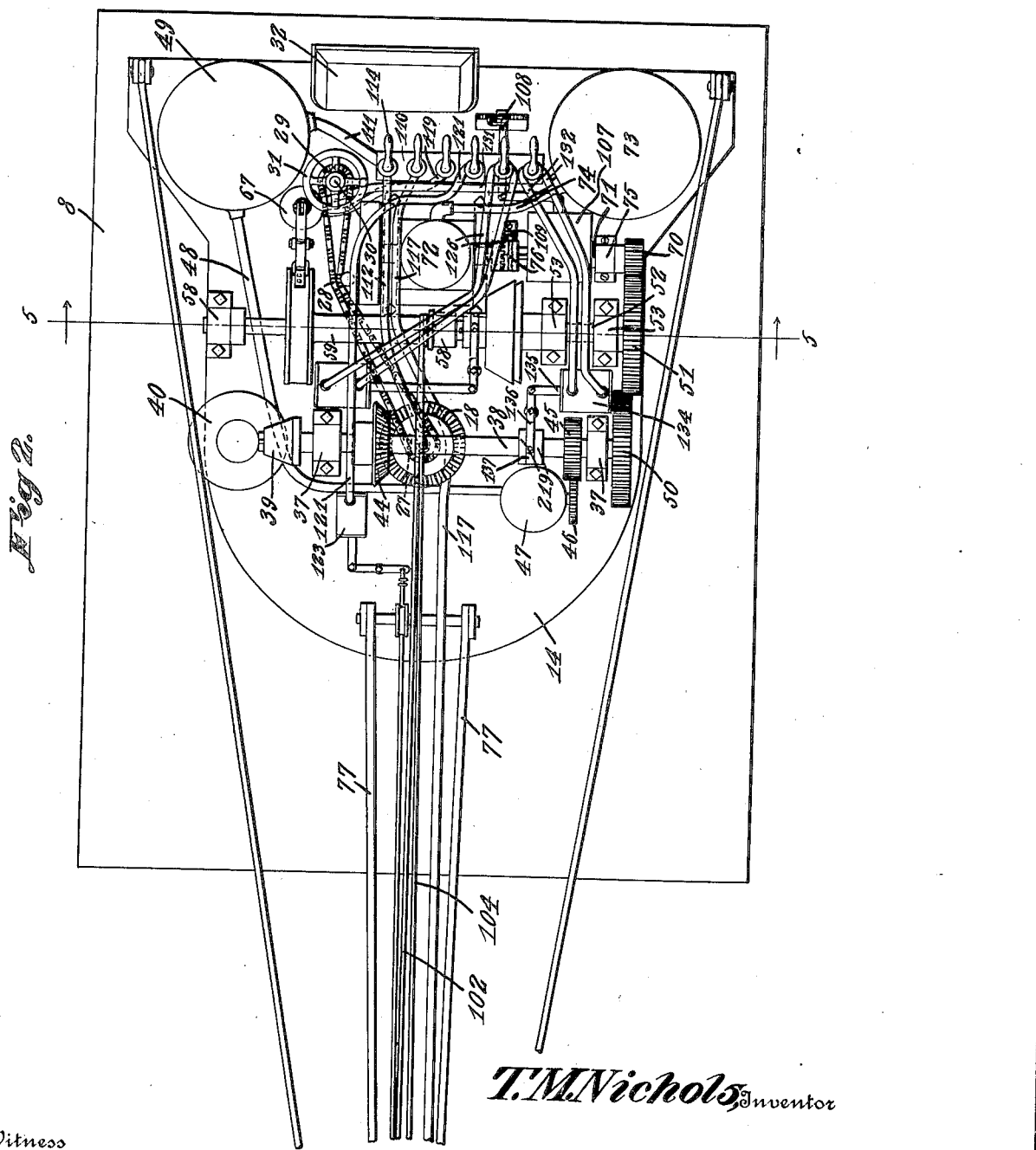

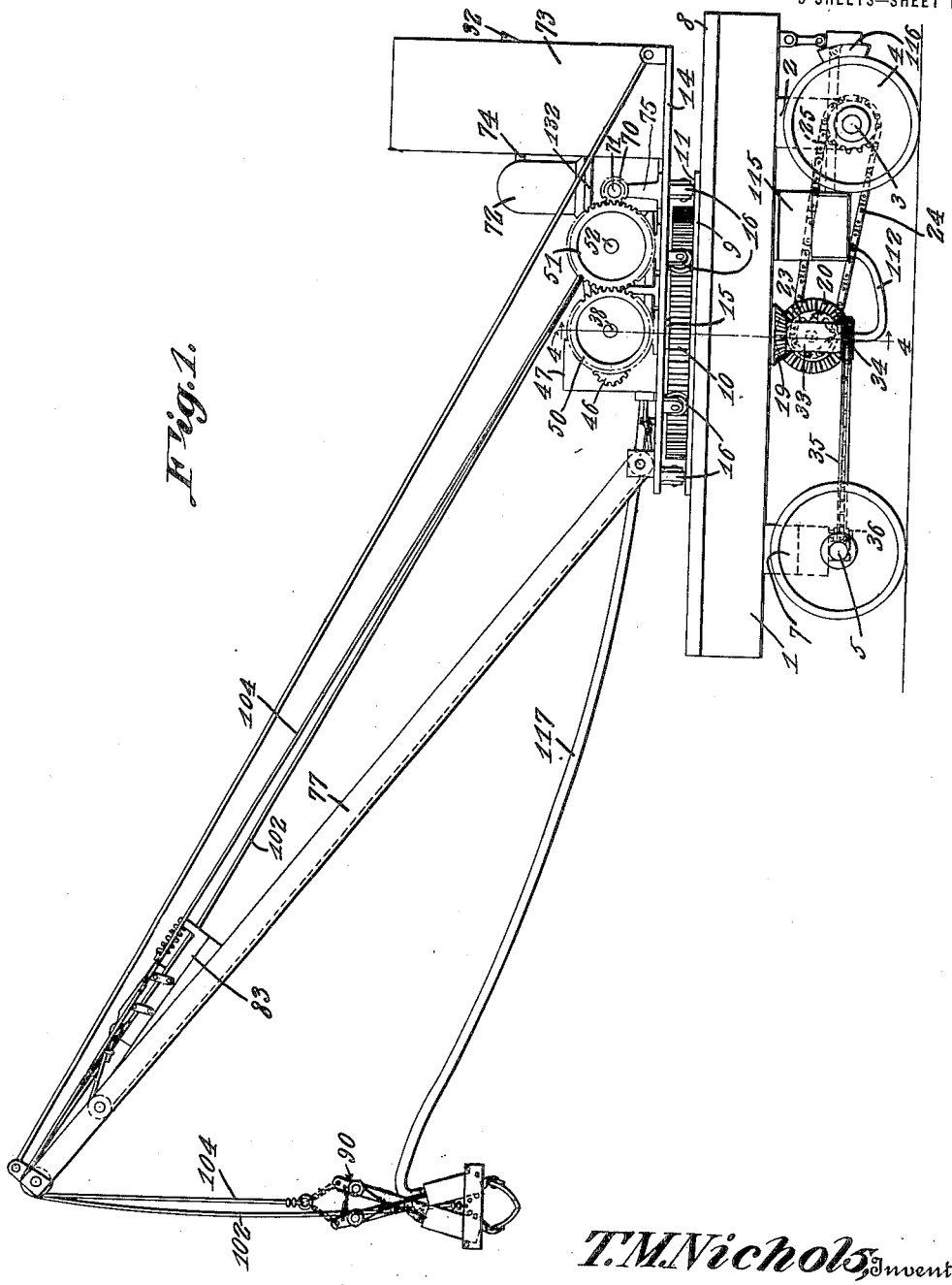

T. M. NICHOLS.
CRANE.
APPLICATION FILED NOV. 22, 1919.

1,434,623.

Patented Nov. 7, 1922.
5 SHEETS—SHEET 3.

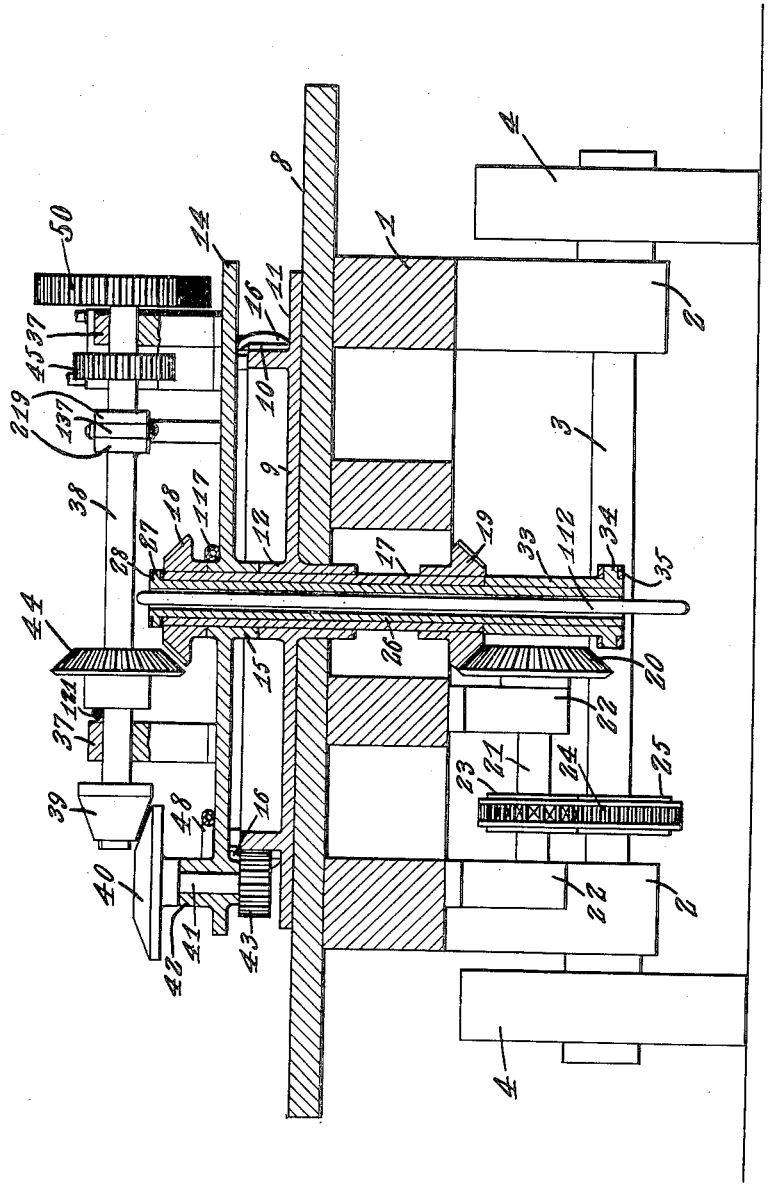

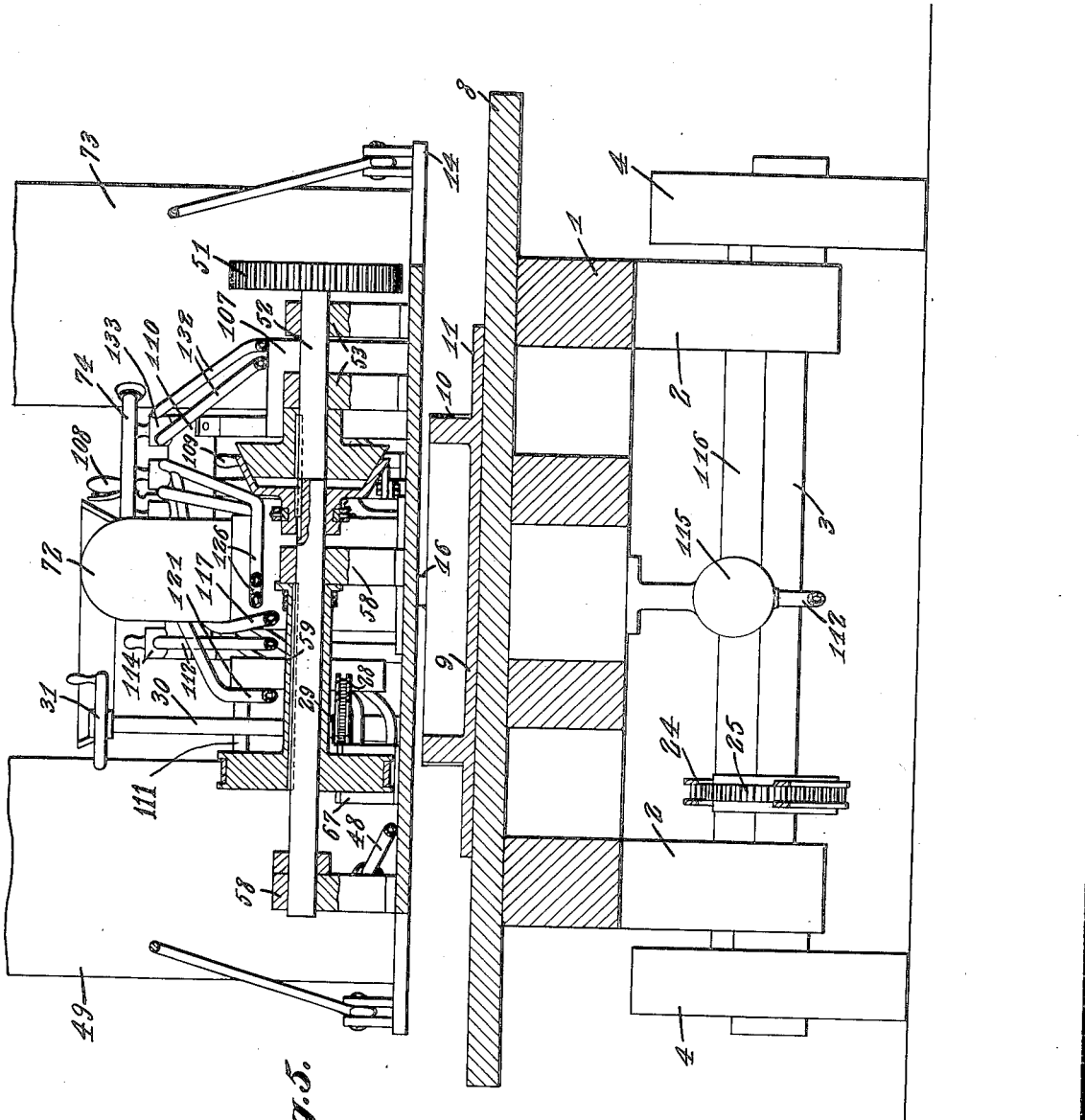

Patented Nov. 7, 1922.

1,434,623

UNITED STATES PATENT OFFICE.

THOMAS MILLARD NICHOLS, OF ASHLAND, KENTUCKY.

CRANE.

Application filed November 22, 1919. Serial No. 339,828.

*To all whom it may concern:*

Be it known that I, THOMAS M. NICHOLS, a citizen of the United States, residing at Ashland, in the county of Boyd and State of Kentucky, have invented a new and useful Crane, of which the following is a specification.

The device forming the subject matter of this application is a crane of that general type shown in my prior Patent No. 1,307,412, granted on the 24th day of June 1919.

The present invention aims to provide novel means for propelling the truck, operating the turn table, and braking the movement of the truck.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1 shows in side elevation, a device constructed in accordance with the invention; Figure 2 is a top plan wherein parts are broken away; Figure 3 is a bottom plan, parts being broken away; Figure 4 is a transverse section taken on the line 4—4 of Figure 1; Figure 5 is a transverse section taken on the line 5—5 of Figure 2.

The numeral 1 denotes a truck frame carrying bearings 2 wherein an axle 3 is journaled for rotation, the axle 3 carrying wheels 4. The numeral 5 denotes an axle held by a king bolt 6, or otherwise, to the truck frame 1, to swing in a horizontal plane, for the purpose of steering the machine. Wheels 7 are journaled on the ends of the axle 5.

The platform of the truck is designated by the numeral 8 and carries a base plate 9 provided with an upstanding annular rack 10, that portion of the base plate 9 which extends outwardly beyond the rack 10 forming a track 11. Noting Figure 4, it will be observed that the base plate 9 has a tubular bearing 12 upstanding from the base plate and extended downwardly therefrom, through the platform 8 of the truck.

The invention comprises a turn table 14 having a tubular bearing 15 cooperating with the upper end of the bearing 12 of the base plate 9. Wheels 16 are supported for rotation on the turn table 14 and cooperate with the track 11 of the base plate 9 to form an anti-frictional mounting for the turn table.

A tubular shaft 17 is mounted to rotate in the bearings 12 and 15. A beveled pinion 18 is secured to the upper end of the shaft 17 and cooperates with the bearing 15 to limit the downward movement of the shaft 17, said shaft coacting with the bearing 12 of the base plate 9 to maintain the turn table 14 centered for rotation. A beveled pinion 19 is secured to the lower end of the tubular shaft 17 and meshes into a beveled pinion 20 secured to a horizontal shaft 21 journaled in hangers 22 on the truck frame 1. The shaft 21 carries a sprocket wheel 23 engaged with a sprocket chain 24, the chain 24 being engaged with a sprocket wheel 25 on the axle 3.

Located within the tubular shaft 17 and rotatable therein, is a second tubular shaft 26 provided at its upper end with a sprocket wheel 27 serving to hold the shaft 26 against downward movement, and cooperating with a sprocket chain 28 engaged with a sprocket wheel 29 carried by a vertical steering shaft 30 journaled on the turn table 14 and provided at its upper end with a handwheel 31, the hand wheel being located in accessible relation to a seat 32 carried by the turn table. A sleeve 33 is fixed to the lower end of the tubular shaft 26, below the lower end of the tubular shaft 17, the sleeve carrying a sprocket wheel 34 engaged with a sprocket chain 35 as shown best in Figure 3, the extremities of the sprocket chain being attached, as indicated at 36, to the movable axle 5, on opposite sides of the king bolt 6.

Bearings 37 are erected on the turn table 14, and therein a shaft 38 is mounted for rotation and for longitudinal sliding movement, Figure 4 being noted at this point. A beveled friction wheel 39 is secured to one end of the shaft 38 and is adapted to be moved, when the shaft 38 moves endwise, into and out of engagement with a beveled friction wheel 40 carried by a vertical shaft 41 journaled in a bearing 42 on the turn table 14. A pinion 43 is secured to the lower end of the shaft 41 and meshes into the rack 10 which forms a part of the base plate 9. There is a beveled pinion 44 on the shaft 38, and when the said shaft is moved longitudinally in the bearings 37 the beveled pinion moves into and out of engagement with the beveled pinion 18 which is secured to the upper end of the shaft 17.

Noting Figure 2, it will be seen that the shaft 38 carries a gear wheel 45 cooperating with a gear wheel 46 constituting a part of an air compressor 47. From the compressor 47, a pipe 48 leads to an air tank 49 mounted on the turn table 14. On one end of the shaft 38 a gear wheel 50 is mounted.

The gear wheel 50 meshes into a gear wheel 51 which, as shown in Figure 5, is secured to one member of a shaft 52, the shaft being journaled in bearings 53—58 erected on the turn table 14.

The gear wheel 51 on the shaft 52 above alluded to meshes into a pinion 70 on a shaft 71 constituting a part of an internal combustion engine 72 mounted on the turn table 14. A water tank 73 is carried by the turn table, and a pipe 74 leads from the tank 73 to the water jacket of the engine 72 for the obvious purpose of cooling the engine. A clutch 76 may be interposed in the shaft 71 of the internal combustion engine 72, the clutch being operated by a lever 109, or in any other suitable way. That end of the shaft 71 of the internal combustion engine which is adjacent to the pinion 70 may be supported in a bearing 75 on the turn table 14. A reversing mechanism 107 may be interposed in the engine shaft 71 the reversing mechanism being operated by any suitable means indicated at 108.

A manifold 110 is supported on the turn table 14, compressed air being supplied to the manifold through a pipe 111 leading to the air tank 49. A pipe 112 leads from the manifold 110 and is extended downwardly through the hollow shaft 26 as Figure 4 will disclose. The pipe 112 is controlled by a valve 114, and leads to a cylinder 115 located beneath the truck and controlling a brake mechanism 116 coacting with the wheels 4.

Pipes 132 lead from the manifold 110 and are controlled by a valve 133. The pipes 132 lead to a cylinder 134, the piston rod 135 of which is connected to one end of a lever 136, fulcrumed intermediate its ends on the turn table 14, the other end of the lever 136 being pivoted to a collar 137 operating between abutments 219 on the shaft 38 of Figure 4.

The steering of the machine is brought about by a train of elements including the hand wheel 31, the shaft 30, the sprocket chain 28, the sprocket wheel 27 on the upper end of the tubular shaft 26, the tubular shaft 26, the collar 33 on the lower end of the tubular shaft 26, the sprocket wheel 34 on the sleeve 33, the sprocket chain 35 shown in Figure 3, the axle 5 mounted to swing on the king bolt 6, and the wheels 7.

Let it be supposed that it is desired to propel the truck 1. Then the valve 133 is manipulated so as to admit air into the appropriate one of the pipes 132, the piston rod 135 of the cylinder 134 being operated to actuate the lever 136. The lever 136, coacting with the ring 137 and the abutments 219 (see Figure 4) moves the shaft 38 to the right (Figure 4) until the beveled pinion 44 is in mesh with the beveled pinion 18. Now there is established a driving train embodying the internal combustion engine 72, its shaft 71, the pinion 70, the gear wheel 51, the gear wheel 50, the shaft 38, the beveled pinion 44, the beveled pinion 18, the tubular shaft 17, the beveled pinion 19, the beveled pinion 20, the shaft 21, the sprocket wheel 23, the sprocket chain 24, the sprocket wheel 25, the shaft 3, and the wheels 4.

Let it be supposed however, that it is desired to rotate the turn table 14. Then, through the instrumentality of the valve 133 and the appropriate one of the pipes 132, the rod 135 of the cylinder 134 operates the lever 136 to shift the shaft 38 to the left (Figure 4) until the beveled pinion 44 of the propelling mechanism is out of engagement with the beveled pinion 18, the friction wheel 39 of the shaft 38 being brought into engagement with the friction wheel 40 of the shaft 41. Now, for the purpose of rotating the turn table 14, there is established a driving train embodying the internal combustion engine 72, its shaft 71, the pinion 70, the gear wheel 51, the gear wheel 50, the shaft 38, the friction wheel 39, the friction wheel 40, the shaft 41, the pinion 43, and the rack 10 of the base plate 9.

If the brakes 116 are to be set, air is admitted into the pipe 112 from the manifold 110 by a proper manipulation of the valve 114. The pressure is transmitted to the cylinder 115, the brakes 116 being set on the wheels 4.

Noting Figure 2 of the drawings, it will be clear that the shaft 38 transmits motion by way of the gear wheel 45 and the pinion 46 to the air compressor 47, pressure being transmitted from the compressor to the tank 49 by way of the pipe 48. The pressure in the tank 49 is carried to the manifold 110 through the pipe 111.

Since the device forming the subject matter of this application is a propelling and brake mechanism, parts not related thereto and shown incidentally in the drawings may be passed over with a brief catalogue description. The frame comprises a drum 59 on the shaft 52, a boom 77 mounted on the turn table 14, a grab 90, a releasing line 102 for the grab, and a load-lifting line 104 assembled with the grab, the lines 102 and 104 being connected to the drum 59, and a clamp 83 for the releasing line 102, the clamp being mounted on the boom. Pneumatic means 121—123 communicates with the manifold 110 and controls the clamp 83. A fluid pressure means 117, connected with the manifold, operates the grab 90. The drum 59 is under the control of a brake 67, operated by pneumatic means 119—131, connected to the manifold 110. Pneumatic means 126, communicating with the manifold 110, is effective to couple the drum 59 to the shaft 52.

Having thus described the invention, what is claimed is:—

1. In a device of the class described, a truck; a propelling mechanism for the truck; a turn table journaled on the truck; mechanism for rotating the turn table; a shaft journaled on the truck and slidable to cooperate with either of said mechanisms at the will of an operator; a fluid pressure cylinder on the truck; a piston operating in the cylinder; means for connecting the piston to the shaft to slide the same; a source of fluid pressure supply on the truck; a conduit leading from said source to the cylinder; and a valve in the conduit.

2. In a device of the class described, a truck; a propelling mechanism therefor; a first hollow shaft journaled on the truck and constituting a part of the propelling mechanism; means for driving the shaft; a turn table journaled on the shaft; a steering mechanism including a second hollow shaft journaled in the first hollow shaft; a brake for the truck; and means for operating the brake, said means passing through the second hollow shaft.

In testimony that I claim the foregoing as my own, I have hereto affixed my signature in the presence of two witnesses.

THOMAS MILLARD NICHOLS.

Witnesses:
C. H. WESSEL,
GEO. H. BARNEY.